United States Patent
Stowell et al.

(10) Patent No.: US 10,144,872 B2
(45) Date of Patent: Dec. 4, 2018

(54) FLAME RETARDANT ADDITIVE COMPOSITION COMPRISING CYCLIC PHOSPHONATE BLEND AND BIS-PHOSPHATE ESTER, AND POLYURETHANE FOAM CONTAINING THE SAME

(71) Applicant: ICL-IP AMERICA INC., Ardsley, NY (US)

(72) Inventors: Jeffrey K. Stowell, Wingdale, NY (US); Andrew Piotrowski, Yorktown Heights, NY (US); Mike Nagridge, Troy, MI (US); Greg Symes, Brentwood, TN (US)

(73) Assignee: ICL-IP America Inc., Tarrytown, NY (US)

( * ) Notice: Subject to any disclaimer, the term of this patent is extended or adjusted under 35 U.S.C. 154(b) by 47 days.

(21) Appl. No.: 15/039,273

(22) PCT Filed: Dec. 12, 2014

(86) PCT No.: PCT/US2014/070000
§ 371 (c)(1),
(2) Date: May 25, 2016

(87) PCT Pub. No.: WO2015/094961
PCT Pub. Date: Jun. 25, 2015

(65) Prior Publication Data
US 2017/0158962 A1 Jun. 8, 2017

Related U.S. Application Data

(60) Provisional application No. 61/916,935, filed on Dec. 17, 2013.

(51) Int. Cl.
*C08J 9/00* (2006.01)
*C09K 21/12* (2006.01)
*C08K 5/523* (2006.01)
*C08K 5/5357* (2006.01)
*C08K 5/521* (2006.01)

(52) U.S. Cl.
CPC .............. *C09K 21/12* (2013.01); *C08J 9/0038* (2013.01); *C08K 5/521* (2013.01); *C08K 5/523* (2013.01); *C08K 5/5357* (2013.01); *C08J 2205/06* (2013.01); *C08J 2375/04* (2013.01); *C08K 2201/014* (2013.01)

(58) Field of Classification Search
CPC .. C08J 9/0038; C08J 2205/06; C08J 2375/04; C08K 5/521; C08K 5/523; C08K 5/5357; C08K 2201/014; C09K 21/12
See application file for complete search history.

(56) References Cited

U.S. PATENT DOCUMENTS

| | | | |
|---|---|---|---|
| 3,789,091 A | 1/1974 | Anderson et al. | |
| 3,849,368 A | 11/1974 | Anderson et al. | |
| 3,890,409 A * | 6/1975 | Mayerhoefer | C07F 9/65742 524/118 |
| 4,273,881 A | 6/1981 | Otten | |
| 5,229,427 A | 7/1993 | Madaj | |
| 5,710,305 A * | 1/1998 | Archer | C07F 9/657181 524/117 |
| 2006/0189730 A1 | 8/2006 | Hong et al. | |
| 2007/0112084 A1* | 5/2007 | Hansel | C08G 18/388 521/107 |
| 2007/0155875 A1 | 7/2007 | Ku et al. | |
| 2008/0105857 A1 | 5/2008 | Couillens et al. | |
| 2008/0157038 A1 | 7/2008 | Hong et al. | |
| 2009/0143494 A1 | 6/2009 | Mack et al. | |
| 2009/0149561 A1* | 6/2009 | Worku | C08J 9/0038 521/79 |
| 2010/0298454 A1 | 11/2010 | Chew et al. | |
| 2010/0298475 A1* | 11/2010 | Wilson | C08K 5/5357 524/119 |
| 2011/0237144 A1 | 9/2011 | Chew et al. | |

FOREIGN PATENT DOCUMENTS

EP 121 8433 B1 8/2003

OTHER PUBLICATIONS

International Preliminary Report on Patentability with Written Opinion dated Jun. 21, 2016.

* cited by examiner

Primary Examiner — John M Cooney
(74) Attorney, Agent, or Firm — Dilworth & Barrese, LLP

(57) ABSTRACT

There is provided herein a flame retardant additive composition comprising (a) a cyclic phosphonate mixture of (i) (5-ethyl-2-methyl-2-oxido-1,3,2-dioxaphosphorinan-5-yl) methyl methyl ester of P-alkylphosphonic acid and (ii) bis[(5-ethyl-2-2-methyl-2-oxido-1,3,2-dioxaphosphorinan-5-yl)methyl]ester of P-alkyl phosphonic acid; and, (b) an aryl bisphosphate ester of the general formula (I) herein. There is also provided herein a polyurethane foam containing the flame retardant additive composition as well as articles made comprising said polyurethane foam.

13 Claims, No Drawings

FLAME RETARDANT ADDITIVE COMPOSITION COMPRISING CYCLIC PHOSPHONATE BLEND AND BIS-PHOSPHATE ESTER, AND POLYURETHANE FOAM CONTAINING THE SAME

This application claims priority to Provisional U.S. Patent Application No. 61/916,935 filed on Dec. 17, 2013, the entire contents of which is incorporated by reference herein in it entirety.

FIELD OF THE INVENTION

This invention relates to a flame retardant additive composition, in particular a flame retardant additive composition for polyurethane foams, e.g., flexible polyurethane foams for automotive and furniture applications amongst others. The flame retardant additive composition comprises a blend of cyclic phosphonates and, at least one bisphosphate ester.

DETAILED DESCRIPTION OF THE RELATED ART

Flame retardant additives play an important role in safeguarding life and property by reducing the overall fire risk associated with using highly combustible raw materials in building and consumer products. Flame retardant additives are formulated into products to help prevent fires from starting and/or to dramatically slow the combustion process. As such, flame retardants contribute to longer escape times and reduce the associated risks for first responders in fire situations.

Flexible polyurethane foams are widely used as cushioning and/or padding materials, with some common examples being furniture and automobile applications. Flame retardants need to function without negatively impacting the physical properties of the foam, especially in low density foam formulations (typically below 1.2 lb/ft³ or pcf). Lower density formulations generally require higher flame retardant loading, often making the task of changing flame retardants a complex and time consuming endeavor.

SUMMARY OF THE INVENTION

The present invention provides a flame retardant additive composition comprising:
(a) a cyclic phosphonate mixture of (i) (5-ethyl-2-methyl-2-oxido-1,3,2-dioxaphosphorinan-5-yl)methyl methyl ester of P-alkylphosphonic acid and (ii) bis[(5-ethyl-2-2-methyl-2-oxido-1,3,2-dioxaphosphorinan-5-yl)methyl]ester of P-alkyl phosphoric acid, wherein the alkyl group in (i) and (ii) each independently contains from 1 to about 4 carbon atoms; and,
(b) an aryl bisphosphate ester of the general formula (I):

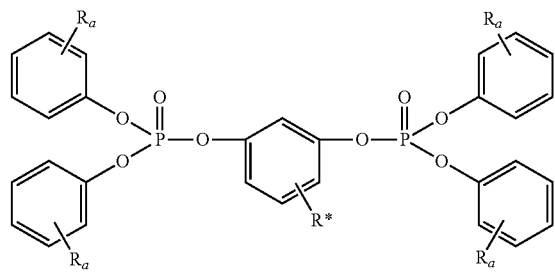

(I)

wherein each R is independently an alkyl group of from 1 to about 4 carbon atoms, R* is R or H, and each subscript is independently zero, 1 or 2.

The present invention also provides a polyurethane foam containing the flame retardant additive composition, e.g., a flexible polyurethane foam, as well as articles made therefrom, such as those employed in automotive and furniture applications.

DETAILED DESCRIPTION OF THE INVENTION

The inventors herein have unexpectedly discovered a flame retardant additive composition comprising a mixture of two cyclic phosphonates, such as the non-limiting example of a cyclic phosphonate mixture sold under the trade name Amgard™ CU, with a bisphosphate ester, such as the non-limiting example of a bisphosphate ester sold under the trade name Fyrolflex™ RDP. The flame retardant additive composition herein provides for improved flame retardant performance (e.g., under California TB117, MVSS 302, BS 5852 and the like), lower scorch and lower volatility as compared to the use of cyclic phosphonates with triaryl phosphates (e.g., isopropylated and t-butylated triphenyl phosphates).

Phosphorus-based flame retardants are well known in the industry to suppress the flammability of different polymer systems by either a vapor phase or condensed phase mechanism, and in some cases both. It is also well known that phosphorus-based flame retardant products often work very well in some polymer systems and very poorly in others. The success or failure of particular phosphorus flame retardants often depends on how its thermal stability and volatility profile matches with those of the polymer matrix it is used in. It may also be highly dependent on the physical state of the polymer (plastic, foam, coating, etc.) and type of flame retardant test required. In summary, phosphorus flame retardant products typically work well in specific flammability applications and rarely work across a wide variety of polymer applications.

Given the negative affect that char-forming flame retardant additives have on the flammability of flexible polyurethane foam, it is generally more acceptable to design/use vapor phase flame retardant products in flexible foam applications. In many cases these have been halogenated and/or halogen/phosphorus based products, but as new products are designed there has been an interest in developing products based on phosphorus-based flame retardants alone. These phosphorus-based products must be designed with the same criteria in mind; with the intent of using a vapor phase active product.

Triaryl phosphate esters (isopropylated and t-butylated) have a long history in being used as vapor phase flame retardants in flexible polyurethane foam applications, and currently account for a majority of the halogen-free flame retardant products in the market for flexible polyurethane foam. One of the primary reasons these products work well is related to their volatility profile. Triaryl phosphate esters are stable enough to survive the >160° C. temperatures achieved during the production of flexible foam, but volatile enough to function as vapor phase flame retardants during polymer combustion. It has been determined from many internal evaluations and external sources that there is an optimal thermal stability range for developing phosphorus based products for application in flexible foam. The much more stable and less volatile phosphorus products used in thermoplastic applications (e.g., phosphorous products such as bisphosphates like Fyrolflex RDP) have not previously been thought to be sufficiently efficient for use in polyurethane foam applications, because it typically takes much higher addition levels and in many cases they still do not provide an acceptable flame retarded foam (e.g., in the California TB 117 test).

Unexpectedly the inventors herein have herein found that using the much less-thought-to-be efficient flame retardant Fyrolflex RDP (in the California TB 117 test for upholstery furniture foam) in place of the previously used triaryl phosphates in a novel and unexpected blend with a cyclic phosphonate ester product gives an unexpected and much improved flammability performance in the California TB 117 flammability test. This unexpected efficiency improvement was even greater when observed in other flammability tests such as the British Standard 5852. Depending on the flammability test evaluated, the blends based on the bisphosphate (Fyrolflex RDP) were between 10 and 30 percent more efficient on a wt/wt addition level in the polyurethane foam formulation. This result was an unexpected discovery and could not be anticipated based on the independent performance characteristics of the bisphosphate ester products.

In one embodiment herein the aryl bisphosphate ester of the general formula (I) is non-halogenated, and thus, there are also provided herein flame retarded additive compositions, as described herein, which are non-halogenated.

As used throughout this document, the abbreviation "php" stands for parts (by weight) per hundred polyol.

In one embodiment herein the two diesters (i) and (ii) of the cyclic phosphonate mixture (a) are P-alkylphosphonic acid diesters of P-methylphosphonic acid.

In the cyclic phosphonate mixture (a), there are two P-alkylphosphonic acid diesters. One diester has one (5-ethyl-2-methyl-2-oxido-1,3,2-dioxaphosphorinan-5-yl) methyl ester group, and the other diester has two (5-ethyl-2-methyl-2-oxido-1,3,2-dioxaphosphorinan-5-yl)methyl ester groups. In the P-alkylphosphonic moiety of the P-alkylphosphonic acid diesters, the alkyl group has one to about six carbon atoms. Examples of suitable alkyl groups include methyl, ethyl, n-propyl, isopropyl, n-butyl, sec-butyl, and the like. Preferred alkyl groups for the P-alkylphosphonic moiety include methyl and ethyl (so the P-alkylphosphonic moiety is P-methylphosphonic or P-ethylphosphonic), with methyl being more preferred.

For the diester which has one (5-ethyl-2-methyl-2-oxido-1,3,2-dioxaphosphorinan-5-yl)methyl ester group, the alkyl ester group has one to about four carbon atoms. Suitable alkyl groups include methyl, ethyl, n-propyl, isopropyl, n-butyl, sec-butyl, and the like. Preferred alkyl groups for the alkyl ester include methyl and ethyl, with methyl being more preferred. Particularly preferred P-alkylphosphonic acid diesters in the practice of this invention are the (5-ethyl-2-methyl-2-oxido-1,3,2-dioxaphosphorinan-5-yl)methyl methyl ester of P-methylphosphonic acid (CAS No. 41203-81-0) and the bis[(5-ethyl-2-methyl-2-oxido-1,3,2-dioxaphosphorinan-5-yl)methyl]ester of P-methylphosphonic acid (CAS No. 42595-45-9).

Proportions of the P-alkylphosphonic acid diester having one (5-ethyl-2-methyl-2-oxido-1,3,2-dioxaphosphorinan-5-yl)methyl ester group to P-alkylphosphonic acid diester having two (5-ethyl-2-methyl-2-oxido-1,3,2-dioxaphosphorinan-5-yl)methyl ester groups can be in the range of about 25:1 to about 1:5, or about 10:1 to about 1:1, or about 5:1 to about 2:1. In the practice of this invention, a particularly preferred ratio of P-alkylphosphonic acid diester having one (5-ethyl-2-methyl-2-oxido-1,3,2-dioxaphosphorinan-5-yl) methyl ester group to P-alkylphosphonic acid diester having two (5-ethyl-2-methyl-2-oxido-1,3,2-dioxaphosphorinan-5-yl)methyl ester groups is about 3.35-3.55:1.

The aryl bisphosphate ester of the general formula (I) described herein can in one embodiment, be such that each subscript is zero and R* is H, or alternatively stated, such can be a resorcinol bisphosphate ester such as Fyrolflex™ RDP.

Another embodiment is when the cyclic phosphonate mixture contains in the range of from about 60 wt. % to about 90 wt. %, or about 70 wt. % to about 85 wt. %, (5-ethyl-2-methyl-2-oxido-1,3,2-dioxaphosphorinan-5-yl) methyl methyl ester of P-alkylphosphonic acid (monomer), and in the range of from about 10 wt. % to about 40 wt. %, or about 15 wt. % to about 30 wt. %, of bis[(5-ethyl-2-methyl-2-oxido-1,3,2-dioxaphosphorinan-5-yl)methyl]ester of P-alkylphosphonic acid (dimer), said weight percents being based on the total weight of the cyclic phosphonate mixture (a).

In another embodiment herein the cyclic phosphonate mixture (a) is present in an amount of from about 10 weight percent to about 40 weight percent, preferably from about 15 to about 30 weight percent, and aryl bisphosphate ester (b) is present in an amount of from about 60 weight percent to about 90 weight percent, preferably from about 70 to about 85 weight percent, said weight percents being based on the total weight of the flame retardant additive composition.

The invention herein also relates to the use of the flame retardant additive composition above in a polyurethane foam-forming composition where the polyurethane foam-forming composition comprises: a) the flame retardant additive composition described herein; b) an isocyanate or polyisocyanate; c) a polyol along with at least one surfactant, d) at least one blowing agent, and e) at least one catalyst. The polyurethane foam-forming composition is such that it can be cured under known conditions of time and temperature to produce a polyurethane foam, preferably a flexible polyurethane foam, using methods known in the prior art. The polyurethane foam-forming composition can be prepared by bringing together the ingredients thereof in any order. Preferably, the ingredients are mixed or blended by conventional means to ensure a relatively uniform mixture. In another embodiment herein there is provided a polyurethane foam comprising the flame retardant additive composition described herein, that can, in one embodiment, be made by curing the polyurethane foam-forming composition using known methods in the art.

One embodiment of the polyurethane foam-forming composition is when the foam is a flexible polyurethane foam and the polyol is a polyether polyol and/or polyester polyol.

As mentioned above, an embodiment of this invention is a process of making a polyurethane foam. The process comprises including a flame retardant effective amount of the flame retardant additive composition of the invention in a polymerization formulation (curing formulation) comprised of isocyanate and polyol along with at least one surfactant, at least one blowing agent, at least one catalyst, and reacting (curing) the mixture to form a polyurethane foam, preferably a flexible polyurethane foam.

To provide flame retardancy to polyurethane foams, the flame retardant additive composition is typically included as one the additives employed in the polyurethane foam formation process. The polyurethane foam is usually formed under normal polyurethane foam formation conditions and normal polyurethane foam formation methods/processes such as is known in the art.

Polyurethane foams, especially flexible polyurethane foams are typically formed by bringing together two liquids, isocyanates and polyols. The polyols are polyether or polyester polyols. The reaction readily occurs at room temperature in the presence of a blowing agent such as water, a volatile hydrocarbon, halocarbon, or halohydrocarbon, or mixtures of two or more such materials.

The polyol or polyols used in forming the polyurethane foams in the practice of this invention can be any polyol that can be used to produce flexible polyurethane foams. When flexible polyurethane foam is being formed, the polyol usually is a polyol or mixture of polyols having hydroxyl numbers up to about 150 mg KOH/g, preferably in the range of 0 to about 100 mg KOH/g, and more preferably in the range of about 10 to about 100 mg KOH/g. Suitable polyols for flexible polyurethane foams include polyether polyols. In the practice of this invention, preferred polyols for forming flexible polyurethane foams include Voranol® 3010 polyol, (a polyether polyol having a molecular weight of about 3000 and a hydroxyl number of about 56 mg KOH/g and similar polyether polyols such as polyether trio's.

In the practice of this invention, when forming polyurethane foam, preferably flexible polyurethane foam, the isocyanate can be any isocyanate that is normally used to produce flexible polyurethane foams. Generally, the isocyanate has at least one isocyanate group, more preferably two isocyanate groups, and molecules having more than two isocyanate groups can be utilized. Preferably, diisocyanates are used. The isocyanates used herein can be aliphatic or aromatic isocyanates. Examples of isocyanates that can be used for forming flexible polyurethane foams in the practice of this invention include, but are not limited to, 1,4-tetramethylene diisocyanate, 1,5-pentamethylene diisocyanate, 2-methyl-1,5-pentamethylene diisocyanate, 1,6-hexamethylene diisocyanate, (HMDI), 1,7-heptamethylene diisocyanate, 1,10-decamethylene diisocyanate, cyclohexylene diisocyanate, isophorone diisocyanate (IPDI), 2,2,4-trimethylhexamethylene diisocyanate, 2,4,4-trimethyihexamethylene diisocyanate, 4,4'-methylenebis (cyclohexylisocyanate), phenylene diisocyanate, toluene diisocyanate (TDI), xylene diisocyanate, other alkylated benzene diisocyanates, 1,5-naphthalene diisocyanate, diphenylmethane diisocyanate (MDI, sometimes called methylene diisocyanate), and mixture of any two or more of these. Preferred isocyanates for flexible polyurethane foams include toluene diisocyanate and diphenylmethane diisocyanate.

Suitable blowing agents in the practice of this invention when forming flexible polyurethane foams include water, $CO_2$ (present or formed), and acetone.

Water can also be used as a single blowing agent or as a co-blowing agent in combination with the other blowing agents described herein. Water will react with the isocyanate groups and form urea structures and release carbon dioxide.

Catalyst systems for forming flexible polyurethane foams include amine catalysts such as dimethylethyl amine, triethylene diamine, and bis(dimethylaminoethyl)ether, tin-based catalysts, bismuth-based catalysts, or other organometallic catalysts. A preferred catalyst system is a combination or blend of amine catalysts such as a blend of dimethylethyl amine, triethylene diamine, and bis(dimethylaminoethyl) ether. Another preferred catalyst includes triethylenediamine (33%) in dipropylene glycol, and stannous octoate. The catalysts are usually used in amounts of about 0.001 to about 2 parts by weight per 100 parts by weight of the polyol(s).

One or more optional additives can be included when forming a flexible polyurethane foam. Such optional additives include surfactants, antioxidants, diluents, chain extenders or cross-linkers, synergists (preferably melamine), stabilizers, coloring agents, fillers, antistatic agents, cell openers, and plasticizers.

Surfactants such as substituted silicone compounds are often used in order to maintain homogeneity of the cells in the polymerization system.

Cell openers, a particular type of surfactant, are typically polyalkylene oxides. Suitable polyalkylene oxide cell openers in the practice of this invention include polyethylene glycol monoallyl ether, polyethylene glycol allyl methyl diether, polyethylene glycol monoallyl ether acetate, polyethylene glycol monomethyl ether, polyethylene glycol glycerol ether, polyethylene-polypropylene glycol monoallyl ether, polyethylene-polypropylene glycol monoallyl monomethyl diether, and polyethylene-polypropylene glycol allyl ether acetate.

These surface-active substances are usually used in amounts of from 0.01 to 5 parts by weight based on 100 parts by weight of polyol blend.

Substances and proportions in the flexible polyurethane foams, including preferences for such substances and the proportions thereof, are as described above for the methods of formation of the flexible polyurethane foams, respectively.

In the forming the polyurethane foams of the invention, a flame retardant effective amount of the flame retardant additive composition is used. By a flame retardant effective amount is meant that amount of the flame retardant additive composition needed to obtain the desired level of flame retardancy. At least for flexible polyurethane foams, a flame retardant effective amount is typically in the range of about 3 php to about 35 php, preferably is in the range of about 5 php to about 30 php, and more preferably is in the range of about 8 php to about 25 php. Based on the total weight of the polyurethane foam, a flame retardant effective amount of flame retardant additive composition is from about 1 weight percent to about 20 weight percent, preferably from about 3 weight percent to about 15 weight percent.

It has been observed in the practice of this invention, at least for work with flexible polyurethane foams, that the loading of the flame retardant additive composition can be reduced by at least about 5 weight %, preferably at least about 20 weight % in comparison to that of some of the more commonly used flame retardants such as tris(1,3-dichloropropyl) phosphate (TDCP) and less commonly used flame retardants such as cyclic phosphonates mixed with triaryl phosphate ester, and that the polyurethane foam formed with this lower loading of the flame retardant additive composition passes flame retardance tests ranging from the California Technical Bulletin 117 to the more demanding British Standard 5852 (crib 5 criteria).

The polyurethane foam, preferably the flexible polyurethane foam, containing the flame retardant additive composition described herein has a level of volatiles associated with the flame retardant additive that is less than an equivalent polyurethane foam which contains a phosphate other than aryl bisphosphate ester (b) in the flame retardant additive composition. The volatility, i.e., the level of VOC's in the associated with the flame retardant additive, of the polyurethane foam containing the flame retardant additive composition herein can be reduced by at least about 10%, preferably by at least about 25% in comparison to that of the volatility of some conventional polyurethane foams containing conventional flame retardants such as cyclic phosphonates mixed with triaryl phosphate ester, e.g., resorcinol bisphosphate ester such as Fyrolflex™ RDP.

The polyurethane foam, preferably the flexible polyurethane foam, containing the flame retardant additive composition described herein has a flame retardancy which is greater than an equivalent flexible polyurethane foam which contains a phosphate other than aryl bisphosphate ester (b) in the flame retardant additive composition. The flame retardancy of the polyurethane foam containing the flame retardant additive composition herein can be increased in comparison to that of the flame retardancy of some conventional polyurethane foams containing conventional flame retardants such as cyclic phosphonates mixed with triaryl phosphate ester, e.g., resorcinol bisphosphate ester such as Fyrolflex™ RDP, which is evidenced by the above noted lower add-on levels of flame retardant in the present invention.

Further, the flexible polyurethane foams may be used to form articles such as molded foams, slabstock foams, and may be used as cushioning material in furniture and automotive seating, and as packaging foam.

It should be noted that the flame retardant additive composition of the present invention may be used in the polyurethane foam-forming composition mentioned above for making articles containing polyurethane foam. The method used in producing an article from the polyurethane foam-forming composition of the present invention is not particularly limited, and any method commonly used may be employed. Exemplary articles are those produced by such methods include moldings such as injection molding, blow molding, extrusion, sheet forming, thermal molding, rotational molding, and lamination.

In one embodiment the article is at least one of a cushioning or padding material for an automotive application or a furniture application. In one embodiment the articles is used in head-liners in automobiles.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

The invention claimed is:

1. A polyurethane foam comprising a flame retardant additive composition which comprises:
   (a) a cyclic phosphonate mixture of (i) (5-ethyl-2-methyl-2-oxido-1,3,2-dioxaphosphorinan-5-yl)methyl methyl ester of P-methylphosphonic acid and (ii) bis[(5-ethyl-2-methyl-2-oxido-1,3,2-dioxaphosphorinan-5-yl)methyl]ester of P-methyl phosphonic acid; and,
   (b) an aryl bisphosphate ester of the general formula (I):

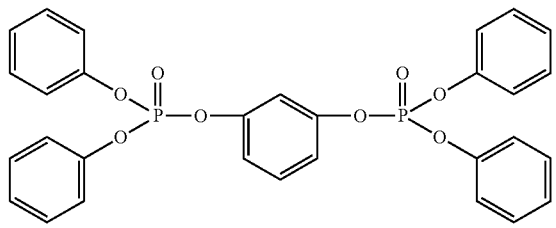

(I)

and wherein the cyclic phosphonate mixture contains (i) in an amount of from about 60 weight percent to about 90 weight percent and (ii) in an amount of from about 10 weight percent to about 40 weight percent based on the total weight of cyclic phosphonate mixture (a) and
wherein cyclic phosphonate mixture (a) is present in an amount of from about 10 weight percent to about 40 weight percent and aryl bisphosphate ester (b) is present in an amount of from about 60 weight percent to about 90 weight percent, said weight percents being based on the total weight of the flame retardant additive composition, and
wherein the flame retardant additive composition is present in an amount of from about 1 weight percent to about 20 weight percent based on the total weight of the polyurethane foam.

2. The polyurethane foam of claim 1 wherein the polyurethane foam is a flexible polyurethane foam.

3. The flexible polyurethane foam of claim 2 wherein the level of volatility is less than an equivalent flexible polyurethane foam which contains a phosphate other than aryl bisphosphate ester (b) in the flame retardant additive composition.

4. The flexible polyurethane foam of claim 2 wherein the level of volatility is less than an equivalent flexible polyurethane foam which contains a triaryl phosphate ester instead of aryl bisphosphate ester (b) in the flame retardant additive composition.

5. The flexible polyurethane foam of claim 2 possessing a flame retardancy which is greater than an equivalent flexible polyurethane foam which contains a phosphate other than aryl bisphosphate ester (b) in the flame retardant additive composition.

6. The flexible polyurethane foam of claim 2 possessing a flame retardancy which is greater than an equivalent flexible polyurethane foam which contains a triaryl phosphate ester instead of aryl bisphosphate ester (b) in the flame retardant additive composition.

7. A polyurethane foam made by curing a mixture of polyol, isocyanate, blowing agent, catalyst and a flame retardant additive composition which composition comprises:
   (a) a cyclic phosphonate mixture of (i) (5-ethyl-2-methyl-2-oxido-1,3,2-dioxaphosphorinan-5-yl)methyl methyl ester of P-methylphosphonic acid and (ii) bis[(5-ethyl-2-methyl-2-oxido-1,3,2-dioxaphosphorinan-5-yl)methyl]ester of P-methyl phosphonic acid; and,
   (b) an aryl bisphosphate ester of the general formula (I):

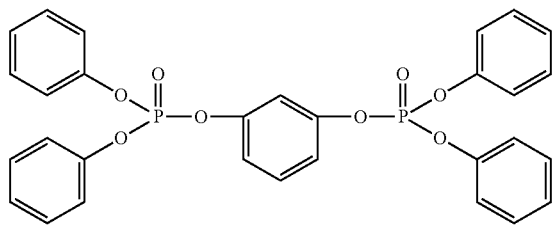

(I)

and wherein the cyclic phosphonate mixture contains (i) in an amount of from about 60 weight percent to about 90 weight percent and (ii) in an amount of from about 10 weight percent to about 40 weight percent based on the total weight of cyclic phosphonate mixture (a) and
wherein cyclic phosphonate mixture (a) is present in an amount of from about 10 weight percent to about 40 weight percent and aryl bisphosphate ester (b) is present in an amount of from about 60 weight percent to about 90 weight percent, said weight percents being based on the total weight of the flame retardant additive composition, and
wherein the flame retardant additive composition is present in an amount of from about 1 weight percent to about 20 weight percent based on the total weight of the polyurethane foam.

8. The polyurethane foam of claim 7 wherein the foam is a flexible polyurethane foam.

9. A molded or extruded article comprising the polyurethane foam of claim 1.

10. The article of claim 9 wherein the article is at least one of a cushioning or padding material for an automotive application or a furniture application.

11. A polyurethane foam-forming composition comprising a polyol, an isocyanate, a blowing agent, a catalyst and a flame retardant additive composition which comprises:
(a) a cyclic phosphonate mixture of (i) (5-ethyl-2-methyl-2-oxido-1,3,2-dioxaphosphorinan-5-yl)methyl methyl ester of P-methylphosphonic acid and (ii) bis[(5-ethyl-2-methyl-2-oxido-1,3,2-dioxaphosphorinan-5-yl)methyl]ester of P-methyl phosphonic acid; and,
(b) an aryl bisphosphate ester of the general formula (I):

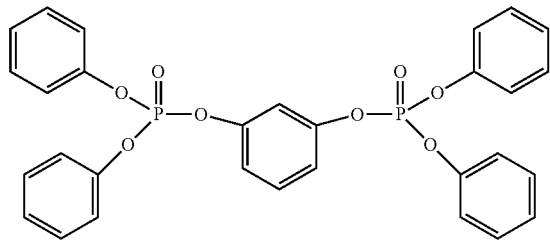

and wherein the cyclic phosphonate mixture contains (i) in an amount of from about 60 weight percent to about 90 weight percent and (ii) in an amount of from about 10 weight percent to about 40 weight percent based on the total weight of cyclic phosphonate mixture (a) and wherein cyclic phosphonate mixture (a) is present in an amount of from about 10 weight percent to about 40 weight percent and aryl bisphosphate ester (b) is present in an amount of from about 60 weight percent to about 90 weight percent, said weight percents being based on the total weight of the flame retardant additive composition, and wherein the flame retardant additive composition is present in an amount of from about 1 weight percent to about 20 weight percent based on the total weight of the polyurethane foam-forming composition.

12. The polyurethane foam-forming composition of claim 11 wherein the flame retardant additive composition further comprises melamine.

13. The polyurethane foam-forming composition of claim 11 which is a flexible polyurethane foam-forming composition.

* * * * *